United States Patent [19]

Dizikes

[11] 4,305,752
[45] Dec. 15, 1981

[54] METALLIC IRON PARTICLES FOR MAGNETIC RECORDING

[75] Inventor: Louis J. Dizikes, Emmaus, Pa.

[73] Assignee: Pfizer Inc., New York, N.Y.

[21] Appl. No.: 156,559

[22] Filed: Jun. 5, 1980

Related U.S. Application Data

[63] Continuation of Ser. No. 61,797, Jul. 30, 1979, Pat. No. 4,256,484.

[51] Int. Cl.³ ............................................... C22B 5/12
[52] U.S. Cl. ............................... 75/0.5 R; 75/0.5 AA; 75/0.5 BA; 75/251; 148/6.35; 148/31.55; 148/105; 148/126; 428/570
[58] Field of Search ............ 75/0.5 R, 0.5 A, 0.5 AA, 75/0.5 B, 0.5 BA, 251–255, 108, 109; 148/31.55, 31.5, 31.57, 105, 126, 6, 6.14 R, 6.35; 428/546, 570, 629, 632, 681, 633; 427/214, 216, 217, 383.9

[56] References Cited

U.S. PATENT DOCUMENTS

| | | | |
|---|---|---|---|
| 3,607,220 | 9/1971 | Van der Giessen et al. | 75/0.5 AA |
| 3,623,859 | 11/1971 | Aldridge | 75/0.5 AA |
| 3,627,509 | 12/1971 | Van der Giessen et al. | 75/0.5 AA |
| 3,663,318 | 5/1972 | Little, Jr. et al. | 148/105 |
| 3,740,266 | 6/1973 | Akashi et al. | 252/62.54 |
| 3,837,839 | 9/1974 | Rau et al. | 75/0.5 AA |
| 4,020,236 | 4/1977 | Aonuma et al. | 148/105 |
| 4,056,410 | 11/1977 | Corradi et al. | 75/0.5 BA |
| 4,063,000 | 12/1977 | Aonuma et al. | 75/0.5 AA |
| 4,067,755 | 1/1978 | Umeki et al. | 75/0.5 AA |
| 4,069,073 | 1/1978 | Todokoro et al. | 148/105 |

FOREIGN PATENT DOCUMENTS

| | | | |
|---|---|---|---|
| 220144 | 8/1957 | Australia | 75/0.5 A |
| 134087 | 4/1972 | Netherlands . | |
| 2016526 | 9/1979 | United Kingdom . | |

*Primary Examiner*—Michael L. Lewis
*Attorney, Agent, or Firm*—Connolly and Hutz

[57] ABSTRACT

In the process for preparing a magnetically stable powder comprising the steps of reducing an iron oxide precursor with a gaseous reduction agent and stabilizing the metallic powder thus produced, the improvement which comprises coating said iron oxide precursor with an antimony compound at a level of up to about 7 weight percent antimony based on the weight of the iron oxide content of the precursor and precipitating tin hydroxides or oxyhydroxides at a level of from about 0.5 to about 8.0 weight percent tin based on the weight of the iron oxide content of the precursor onto the antimony coated iron oxide precursor prior to said reduction.

10 Claims, No Drawings

METALLIC IRON PARTICLES FOR MAGNETIC RECORDING

CROSS-REFERENCE TO RELATED APPLICATION

This application is a continuation of copending application Ser. No. 061,797, filed July 30, 1979, now U.S. Pat. No. 4,256,484.

BACKGROUND OF THE INVENTION

The present invention is concerned with a method to produce magnetically stable iron powder from an iron oxide or iron oxide hydrate. In particular, it is concerned with such a process in which the reduction rate is enhanced so that the reduction is achieved more quickly at a given temperature than is normally possible.

An object of the present invention is to produce an iron powder for magnetic recording which has high coercivity for improved short wavelength response, good orientability and high magnetic moment for high output and good chemical stability for safe handling and long storage. A further object of this invention is to provide a process to prepare said iron powder that is economically attractive. The magnetic material of this invention will find utility in the fields of magnetic copying, for example high speed printing, data storage (discs and tapes) and magnetic recording in the forms of audio and video tapes.

In the past, numerous schemes have been devised for producing iron powders for magnetic recording purposes. U.S. Pat. No. 3,607,220, calls for the treatment of iron powder with stannous chloride solution and then reduction and stabilization to form an iron powder. U.S. Pat. No. 3,623,859, uses bismuth to prevent sintering when making acicular iron particles from iron oxide. U.S. Pat. No. 3,627,509, uses silver to shorten the reduction time when making iron powder from iron oxide. U.S. Pat. No. 3,663,318, discloses a process to make iron powder from salts of iron, cobalt, nickel, and chromium using amineborane and tetrahydroborate. U.S. Pat. No. 3,740,266, discloses a mixture of iron oxide and iron alloys with cobalt or nickel which may contain from about 0.01 to 10% antimony. U.S. Pat. No. 3,837,839, discloses doping iron oxide hydrate with a metal which is catalytic for hydrogen (cobalt, nickel and ruthenium) to speed up the reduction rate. Both U.S. Pat. Nos. 4,063,000 and 4,069,073, list antimony as one of many other metals which may be added to improve unnamed properties of the powder. Finally, Dutch Pat. No. 134087, discloses the preparation of metallic particles by electrolytic precipitation in a liquid mercury cathode. Antimony, in an amount of 2-20 percent, is added to the mercury bath containing the metallic particles to prevent the metallic particles from sintering during the vacuum distillation of the mercury.

SUMMARY OF THE INVENTION

The present invention comprises the following improved process:

in the process for preparing a magnetically stable powder comprising the steps of:

A. reducing an iron oxide precursor selected from the group consisting of an iron oxide, an iron oxide hydrate, a modified iron oxide or a modified iron oxide hydrate with a gaseous reduction agent; and B. stabilizing the metallic powder thus produced, the improvement which comprises:

coating said iron oxide precursor with an antimony compound at a level of up to about 7 weight percent antimony based on the weight of the iron oxide content of said precursor and precipitating tin hydroxides or oxyhydroxides at a level of from about 0.5 to about 8.0 weight percent tin based on the weight of the iron content of said precursor onto the antimony coated iron oxide precursor prior to said reduction. The process is also disclosed wherein the coated iron oxide precursor is further coated with up to about 20 weight percent of at least one metal selected from the group comprising cobalt, chromium and nickel in the form of a hydroxide prior to said reduction. The process is preferred wherein the amount of antimony employed is from about 1 to 4.5 weight percent based on the weight of the iron content of said precursor. The process is also preferred wherein antimony is precipitated onto the surface of the iron oxide precursor. The process is also preferred wherein the reduction is carried out in an atmosphere of hydrogen and wherein the modified iron oxide hydrate is dehydrated prior to the reduction step. In the preferred process, the combined amount of antimony and tin used is up to about 7 weight percent based on the weight of the iron content of said precursor. The process is especially preferred wherein the amount of antimony employed is from about 0.5 to 3.5 weight percent based on the weight of the iron content of said precursor and the amount of tin is from 1 to 4 weight percent based on the weight of the iron content of said precursor.

A magnetically stable powder prepared by the process described above is also claimed as a portion of this invention.

DETAILED DESCRIPTION

The reduction of an iron oxide or iron oxide hydrate to the metallic form by subjecting said iron oxide or iron oxide hydrate to elevated temperatures while introducing a reducing gas is known. A problem of great importance associated with this technology is accomplishing the reduction in a period of time that is economically attractive while maintaining the desired particle shape. In an effort to obtain a short reduction time one would naturally use as high a temperature as possible, the reduction proceeding faster at higher temperatures. However, the use of higher reduction temperatures to accomplish the reaction in a short time causes the particles to become sintered and they thereby lose some of their original configuration. This, of course, results in a degradation of magnetic properties such as coercive force (Hc) and powder squareness (Or/Om) and must be avoided. Lowering the reduction temperature to avoid the sintering causes the reduction time to be so long that it becomes uneconomical. Therefore, an enhancement of the reduction rate without resorting to elevated temperatures which may destroy the magnetic characteristics of the final magnetic material is very desirable.

The present invention represents an advance in the state of the art in that dramatically faster reduction is now possible without resorting to higher temperatures by coating the iron oxide or iron oxide hydrate with an antimony compound at a level of up to about 7 weight percent antimony prior to the reduction. The products resulting from this invention have excellent magnetic properties and are suitable for use as magnetic material for both audio and video recording when combined with a binder to form a magnetic impulse record member.

The essence of the present invention is the enhancement of the reduction rate in a process for producing metallic iron particles by employing a coating of an antimony compound prior to the reduction. Other authors have noticed that metals of Group VIII of the periodic table have this ability to enhance reduction rates and have stated that any metal which is catalytic for hydrogen can perform this function. Even the metals of Group IV of the Periodic Table have sometimes been observed to have this characteristic. However, so far as is known, no one has heretofore observed that antimony, a metal of Group V of the Periodic Table, has this very useful property.

The enhanced reduction can be expressed by the term "Reduction Factor" which is defined as the quotient of the reduction time of an antimony compound coated iron oxide or iron oxide hydrate and the reduction time of an iron oxide or iron oxide hydrate without an antimony coating, both reductions being carried out under identical conditions; that is, sample weight, hydrogen flow rate, temperatures, etc. Reduction time is that amount of time necessary to reduce an iron oxide or iron oxide hydrate from magnetite to the metallic form.

According to the present invention, the iron oxide or iron oxide hydrate starting material is coated with an antimony compound at a level of up to about 7 weight percent antimony based on the weight of the iron oxide before being reduced to the metallic form and subsequently being stabilized. Antimony compounds suitable as the coating are antimony oxides, oxychlorides, chlorides, sulfates and oxyhydroxides. Although as little as about 0.01 weight percent antimony has been found to enhance the reduction, the preferred amount of antimony is at least about 0.5 weight percent. As much as 7 weight percent antimony may be used, although little, if any, further enhancement of the reduction rate is seen above this amount. Additional antimony tends to degrade the magnetic properties of the final magnetic material. A coating is preferred in which from about 1.0 to 4.5 weight percent antimony based on the weight of the iron oxide is employed.

Furthermore, it has been determined that in addition to the antimony coating, a further coating of tin hydroxide or oxyhydroxide, for example up to about 8 weight percent tin based on the weight of the iron oxide results in an improvement in some of the magnetic properties, for example, the coercivity (see Example 12). When one desires to use a coating of antimony and tin, the preferred amount of antimony is from about 0.5 to 3.5 weight percent and the preferred amount of tin is from about 1 to 4 weight percent, both amounts based on the weight of the iron oxide. In the case of this dual coating, the presence of the antimony enhances the reduction rate, evidenced by the low Reduction Factor, and the presence of the tin improves magnetic properties. Small amounts of tin do not appear to affect the reduction rate however amounts greater than about 1.5 weight percent tin have been found to slow down the reduction process somewhat. It is therefore advantageous to use as small an amount of tin as possible to reach the desired magnetic properties.

While the exact mechanism is not known, the possibility exists that since tin melts at temperatures used in this process (275°-425° C.) high levels of tin may completely cover the surface of the particle and inhibit the hydrogen from penetrating and reacting with the iron oxide. Alternatively, the tin may combine with the iron oxide to form a compound more chemically resistant to reduction. The presence of antimony, however, speeds up this reduction process even in the presence of tin. The Reduction Factor in the process containing tin and antimony is 0.6 or less. It should be noted that when the Reduction Factor is calculated for an antimony coated iron oxide or iron oxide hydrate modified with another element, for example tin, the denominator is the reduction time of the modified iron oxide or iron oxide hydrate. The same reduction rate enhancement is expected to be seen in iron oxides or iron oxide hydrates modified with other elements prior to the reduction to the metallic form. In order to further improve the magnetic properties of the final metallic magnetic material up to about 20 weight percent of at least one other metal selected from a group comprising cobalt, nickel, and chromium may be used in accord with this invention.

In the process of the present invention, the iron oxide or iron oxide hydrate is slurried in water. It may be advantageous to adjust the pH of the iron oxide slurry to about 1 with a dilute mineral acid solution. While agitating the slurry, an aqueous solution containing an antimony compound, preferably antimony trichloride, is added. The slurry pH is then adjusted to about 2 with a dilute alkali solution to precipitate the antimony in the form of a salt. Other methods of accomplishing the same type of coating, for example, soaking the iron oxide or iron oxide hydrate in an antimony solution or melting the antimony compound and adding it to the iron oxide or iron oxide hydrate, may be used. Such methods are to be considered a part of this invention. The antimony coated iron oxide or iron oxide hydrate may then be filtered, washed, and dried. The dehydration and reduction can be accomplished in a rotary kiln, a static kiln (muffle furnace), a fluidized bed kiln or the like. The reducing gas employed may be chosen from hydrogen, carbon monoxide or other reducing gases, hydrogen being preferred. The reduction temperature will generally be between about 275° C. and 425° C.

After reduction to the metallic form the particles are stabilized by subjecting them to an air-nitrogen mixture at ambient conditions. Such stabilization is a well known, conventional procedure (see U.S. Pat. No. 3,623,859). The stabilization is started at room temperature using only very small amounts of air in the gas mixture. The amount of air is increased and the nitrogen is decreased over a period of time while maintaining the temperature of the metallic particles below about 50° C. to ensure that a controlled stabilization is achieved. At the end of this stabilization 100% air is being passed over the particles. The metallic material has then been rendered non-pyrophoric and magnetically stable and is suitable for use as the magnetic material in a magnetic impulse record member. Optionally, the final product may be densified, for example, in a mixer-muller or ball mill, if desired, to further improve the magnetic properties.

Other methods of stabilization may be used which are well known in the art, for example, those discussed in the following patents:

U.S. Pat. No. 3,634,063 discusses passivation by contacting iron particles with an aqueous ammonium hydroxide solution, washing with solvent and drying.

Japanese Published application No. J50-4197 discusses passivation using a chromium based outer layer on the particles.

Japanese Published application No. J52-155398 discusses metal powders which are immersed in an organic solvent containing silicone oil to yield oxidation resistant powders.

U.S. Pat. No. 4,069,073 discusses production of non-pyrophoric particles by the use of a solution containing phosphate ions.

Preferred iron oxides or iron oxide hydrates which may be employed as the starting materials for this invention are acicular. The reduction rate of non-acicular particles will also be enhanced by the process of this invention. This is meant to include iron oxides or iron oxide hydrates modified with other metals such as cobalt, chromium and nickel. For purposes of this application acicular particles are defined at those in which the length is substantially greater than the other two dimensions (width and thickness). Particles with sharp or blunt ends are included in this definition.

Suitable iron oxide or iron oxide hydrate starting materials for conversion to the metallic form are gamma iron oxide, magnetite, hematite or yellow iron oxide hydrate chosen from the goethite or lepidocrocite forms. Suitable antimony compounds useful as reagents in this invention may be chosen from antimony chloride and antimony sulfate among others. Suitable tin salts may be chosen from stannous chloride, stannic chloride and stannous sulfate. Generally speaking, other metals which may be included in this invention, for example cobalt, nickel and chromium, will be used in the form of water-soluble salts of those metals. Such salts include, for example, cobalt chloride, cobalt sulfate, nickel chloride, nickel sulfate, chromium chloride or chromium sulfate.

In a preferred process of the present invention, a precipitated lepidocrocite iron oxide hydrate, that has been filtered and washed is reslurried in water, the pH of which has been adjusted to about 1.0 with concentrated hydrochloric acid. An aqueous solution of antimony trichloride, containing enough concentrated hydrochloric acid to keep the antimony in solution is added to the iron oxide hydrate slurry while agitating the mixture. The slurry pH is then adjusted to at least 1.5 with an aqueous sodium hydroxide solution to complete the precipitation of the antimony compound on to the iron oxide hydrate particles. An aqueous tin solution containing stannous chloride and enough concentrated hydrochloric acid to keep the tin in solution is then added to the slurry of antimony compound-coated iron oxide hydrate. The slurry pH is adjusted to at least 2 in order to complete the precipitation of the tin hydroxides or oxyhydroxides onto the coated particles. The slurry is then filtered and the solids are washed and dried. The dried filter cake is then powdered to the desired size. The powdered, coated iron oxide hydrate is dehydrated, then reduced to the metallic form in a fluidized bed reactor at a temperature of about 350° C. in a hydrogen atmosphere. After the reduction is complete, the metallic particles are stabilized in an air-nitrogen mixture as previously described.

The magnetic material of this invention may then be incorporated into a magnetic recording member. Any suitable binding media may be used, for example, those discussed in U.S. Pat. No. 2,711,901 and U.S. Pat. No. 4,018,882.

For the purpose of evaluation, magnetic tapes are prepared using a vinyl copolymer formula such as the one described in Table 1 below in parts by weight, using a 75% by weight of solids loading of magnetic material.

TABLE 1

| Magnetic material | 840 |
| --- | --- |
| Methylabieatemaleic glycol ester | 60 |
| Vinyl resin | 120 |
| A plasticizer | 60 |
| Methylisobutylketone | 500 |
| Toluol | 500 |
| Sodium dioctylsulfosuccinate | 33.5 |

This mixture is ball milled for 20 hours. The formulation is then applied in accordance with known practice to polyethylene terepthalate base in the form of a three inch strip. While the applied coating is still wet, it is run through a magnetic field to orient the particles, in the known manner, after which the strip is dried and may be calendered, compressed or burnished. Finally, it is slit to the desired width and then put on rolls or reels under tension. The coating thickness in the examples to follow in this application was from about 288 to 332 microinches.

The examples to follow are merely illustrative and in no way limit the scope of the appended claims.

EXAMPLE 1

Eight liters of water was acidified to a pH of 1.0 with concentrated hydrochloric acid. While stirring this acidified water, a lepidocrocite filter cake corresponding to 1518 grams of iron oxide was added. The stirring was continued until a well dispersed slurry of 11 liters resulted. To 9.85 liters of this slurry which contained 1362 grams of iron oxide 3 liters of an acidified antimony trichloride solution containing 14.52 grams of antimony was added. The slurry was stirred for about 1 hour and then the pH was adjusted up to 2.0 with a dilute (6%) NaOH solution. The slurry was then filtered, washed, and dried at 82° C. The antimony coated iron oxide hydrate was dehydrated in a rotary kiln by heating to 409° to 412° C. in about 1 hour and held at that temperature for about 2 hours in the presence of air. Approximately 50 milligrams of the antimony coated dehydrated product was reduced to the metallic form by heating to 353° C. in a Mettler TA-1 Thermoanalyzer using 43.2 liters of hydrogen per hour. The heating rate was 25° C. per minute and the reduction to metal required 20 minutes providing a Reduction Factor of 0.31. Passivation of the metallic particles was accomplished by cooling to ambient temperature in nitrogen and then introducing an air-nitrogen mixture containing 0.2 percent air. The temperature rose about 5° C. and then fell to ambient. At that point the particles were passivated. The thus prepared magnetic powder had the following magnetic properties when measured on a vibrating sample magnetometer (VSM) using a 9 kOe maximum field.

Hc - 1077 Oersteds,
Om - 148 emu/gram
Or/Om - 0.50

EXAMPLE 2

In the same manner as described in Example 1, a lepidocrocite precursor was coated with varying amounts of antimony salt and the various samples were filtered, washed, and dried. The coated iron oxide hydrates were then dehydrated in a rotary kiln at between 406 and 420° C. About 55 milligrams of each of the dehydrated coated iron oxides was then reduced to the metallic form in the previously described Mettler thermoanalyzer and passivated as described above in Example 1. The results are shown in Table 1, the control being the same iron oxide hydrate without an antimony salt coating.

TABLE 1

| Ex. # | Weight % Sb Added (Based on the $Fe_2O_3$) | Peak Reaction Temp. °C. | Reduction Time (Minutes) | Reduction Factor |
| --- | --- | --- | --- | --- |
| 2A | 0 (control) | 350 | 64 | — |
| 2B | 0.01 | 349 | 38 | 0.59 |
| 2C | 0.27 | 351 | 35 | 0.55 |
| 2D | 2.13 | 349 | 31 | 0.48 |
| 2E | 3.19 | 351 | 25 | 0.39 |
| 2F | 6.40 | 351 | 30 | 0.47 |

The powder samples above were evaluated for various magnetic characteristics and the results as shown in Table 2 below.

TABLE 2

| Ex. # | Weight % Sb Added (Based on the $Fe_2O_3$) | $Hc_{(Oe)}$ | $Om_{(emu/gram)}$ | Or/Om |
| --- | --- | --- | --- | --- |
| 2A | 0 | 406 | 181 | 0.27 |
| 2B | 0.01 | 496 | 173 | 0.35 |
| 2C | 0.27 | 756 | 165 | 0.44 |
| 2D | 2.13 | 1088 | 153 | 0.50 |
| 2E | 3.19 | 1039 | 140 | 0.48 |
| 2F | 6.40 | 1031 | 130 | 0.47 |

EXAMPLE 3

Sixty liters of water was acidified to a pH of 1.5 with concentrated hydrochloric acid. While agitating the solution, 5.448 kilograms of lepidocrocite filter cake containing 1234 grams of $Fe_2O_3$ was added and was thoroughly dispersed. Over a 15 minute period an acidified antimony trichloride solution containing 6.58 grams of antimony was added to the slurry. The slurry pH was adjusted to 2.0 with an aqueous (10%) NaOH solution. An aqueous acidified stannous chloride solution containing 30.22 grams of tin was then added. The pH of the slurry was then raised to 3.3 with an aqueous (10%) NaOH solution. The coated particles were filtered, washed, and dried at 82° C. The dried, coated product was then dehydrated by heating to 408°–410° C. in about 60 minutes and held at that temperature for 109 minutes in the presence of air in a rotary kiln. Approximately 50 milligrams of the thus prepared coated dehydrated iron oxide was reduced to the metallic form in hydrogen in the previously described Thermoanalyzer and passivated as described. The reduction to metal was accomplished in 53 minutes, providing a Reduction Factor of 0.58.

EXAMPLE 4

Into a 500 gallon reactor equipped with an agitator 280 gallons of water was placed. The water was acidified to a pH of 1.6 with concentrated hydrochloric acid. An amount of lepidocrocite wet filter cake corresponding to 35.4 kilograms of $Fe_2O_3$ was added while agitating to uniformly disperse the filter cake. While agitating the mixture, an acidified antimony trichloride solution containing 491.4 grams of antimony was added. The slurry pH was then adjusted to 2.0 with an aqueous (10%) NaOH solution. An acidified stannous chloride solution containing 579.1 grams of tin was added over a 1 hour period. The pH of the slurry was then adjusted to 2.5 over a 15 minute period using an aqueous (10%) NaOH solution. The coated particles were filtered, washed, and dried. The thus prepared coated material was dehydrated in a rotary kiln by heating to 409° to 415° C. and was held in the presence of air for a period of about 109 minutes. Reduction to the metallic form, which required 31 minutes, was carried out in a Thermoanalyzer in the method previously described.

EXAMPLE 5

Sixty liters of water were acidified to a pH of 1.0 with concentrated hydrochloric acid. 2.724 kilograms of an acicular magnetite prepared by reduction of a yellow iron oxide hydrate was slurried in the acidified water by mechanically agitating the mixture. An acidified antimony trichloride solution containing 28.94 grams of antimony was added to the slurry. A cobalt (II) chloride solution containing 136.27 grams of cobalt was added while agitating the mixture. Dilute NaOH solution (100 grams per liter) was added to the mixture until the pH was 2.5 and after stirring 15 additional minutes the pH was raised to 10.06 with additional dilute NaOH solution. After mixing an additional 15 minutes the coated magnetite was filtered, washed, and dried at 82° C. Approximately 52 milligrams of the thus prepared coated material was reduced to the metallic form and stabilized in a Mettler Thermoanalyzer in the method previously described. The reduction to metal required 32 minutes.

EXAMPLE 6

Sixty liters of water was acidified to a pH of 1.0 with concentrated hydrochloric acid. 2.724 kilograms of gamma iron oxide was slurried in the acidified water by vigorously agitating the mixture for 15 minutes. An acidified antimony trichloride solution containing 28.94 grams of antimony was added to the mixture. A nickel (II) chloride solution containing 135.9 grams of nickel was added. After mixing for 15 minutes the slurry pH was raised to 2.55 by the addition of a dilute (100 gram per liter) NaOH solution. The slurry was mixed for another 15 minutes and then the pH was raised to 10.02 with additional NaOH solution. The coated material was filtered, washed, and dried at 82° C. Approximately 58 milligrams of the dried product was reduced to the metallic form and stabilized in a Mettler Thermoanalyzer as previously described. The reduction to metal required 27 minutes.

EXAMPLE 7

Sixty liters of water was placed in a 20 gallon reactor and acidified to a pH of 1.0 with concentrated hydrochloric acid. 2.724 kilograms of yellow iron oxide hydrate (Goethite) was dispersed therein using vigorous agitation. An acidified antimony trichloride solution containing 28.94 grams of antimony was then added. The pH of the slurry was then raised to 2.0 using a dilute NaOH solution. The coated iron oxide hydrate was filtered, washed, and dried. The dried product was dehydrated in a rotary kiln by heating to a temperature of 404°–410° C. and was held in the presence of air for about 2 hours. Reduction to the metallic form and stabilization was carried out in a Mettler Thermoanalyzer as previously described. The reduction to metal required 21 minutes.

EXAMPLE 8

Sixty liters of water was placed in a 20 gallon reactor and acidified to a pH of 1.0 with concentrated hydrochloric acid. A lepidocrocite wet filter cake corresponding to 1085 grams of $Fe_2O_3$ was added and was thoroughly dispersed using mechanical agitation. An acidified antimony trichloride solution containing 11.57 grams of antimony was added to the mixture. Then a chromium (III) chloride solution containing 1.63 grams of chromium was added and the mixture was stirred for 15 minutes The slurry pH was raised to 2.5 with a dilute NaOH solution (10%) and mixed another 15 minutes. The slurry was then heated to 70° C. and stirred for 1 hour after which the slurry pH was raised to 8.0 by the addition of dilute NaOH solution. After stirring for 1 hour the coated material was filtered, washed, and dried at 82° C. The thus prepared coated iron oxide hydrate was dehydrated in a rotary kiln by heating the material to a temperature of 408°–411° C. and was held at that temperature for about 2 hours in the presence of air. The dehydrated product was reduced to the metallic form and stabilized in a Mettler Thermoanalyzer by the method previously described. The reduction to metal required 38 minutes.

EXAMPLE 9

Into a 20 gallon reactor equipped with an agitator 60 liters of water (pH was 7.1) was placed. 4.54 kilograms of lepidocrocite wet filter cake which corresponds to 1588 grams of $Fe_2O_3$ was slurried therein using mechanical agitation. An acidified antimony trichloride solution containing 22.03 grams of antimony was added to the slurry over a period. The pH at the end of the antimony trichloride addition was 1.3. The pH was elevated to 4.0 by the addition of an aqueous dilute (10%) NaOH solution. An acidified stannous chloride solution containing 25.96 grams of tin (1.63 weight percent based on the weight of the iron oxide) was then added over a 30 minute period. The pH at the end of the stannous chloride addition was 2.1. The slurry pH was then raised to 2.5 by the addition of an aqueous dilute (10%) NaOH solution. The coated iron oxide hydrate was filtered, washed, and dried. The dried iron oxide hydrate product was dehydrated in a rotary kiln heating to 410° to 413° C. and was held at that temperature for about 111 minutes in the presence of air. The coated dehydrated product was reduced to the metallic form and stabilized in a Mettler Thermoanalyzer in the method previously described. The reduction to metal required 35 minutes, providing a Reduction Factor of 0.38.

EXAMPLE 10

Into a gallon reactor equipped with an agitator 60 liters of water was placed. The water was acidified to a pH of 1.5 with concentrated hydrochloric acid. 4.54 kilograms of a lepidocrocite filter cake corresponding to 1416 grams of $Fe_2O_3$ was slurried therein by mechanically agitating the mixture. An acidified antimony trichloride solution containing 19.64 grams of antimony was added. The slurry pH was then adjusted to 2.0 by the addition of an aqueous dilute (10%) NaOH solution. An acidified stannic chloride solution containing 23.14 grams of tin was then added after which the pH of the slurry was adjusted to 2.5 with aqueous dilute (10%) NaOH solution. After stirring for 30 minutes the coated iron oxide hydrate was filtered, washed and dried. The thus prepared coated product was dehydrated in a rotary kiln by heating to 408° C. and holding at that temperature for about 106 minutes in the presence of air. The coated, dehydrated product was reduced to the metallic form and stabilized in a Mettler Thermoanalyzer in the method previously described. The reduction to metal required 36 minutes, providing a Reduction Factor of 0.40.

EXAMPLE 11

Following the procedure of Example 1, a sample of a precipitated cubic magnetite is coated with an antimony compound, reduced in a hydrogen atmosphere and stabilized. The reduction rate is enhanced over that of cubic magnetite without an antimony coating.

EXAMPLE 12

600 gram portions of the dehydration products of Examples 1 and 3 were reduced in a fluidized bed kiln in hydrogen for 22 minutes (Example 1) and 51 minutes (Example 3). A sample of each was then combined with a binder and made into magnetic tapes by the method previously described. The tapes were tested for magnetic properties and the results shown below were obtained.

|  | Coercivity (Oe) | Remanence Br (Gauss) | Squareness Br/Bm* |
|---|---|---|---|
| Tape A (Example 1) | 965 | 2380 | 0.75 |
| Tape B (Example 3) | 1176 | 2415 | 0.76 |

*Hm (field strength) equals 3.0 kOe

I claim:
1. In the process for preparing a magnetically stable powder comprising the steps of
   A. Reducing an iron oxide precursor selected from the group consisting of an iron oxide, an iron oxide hydrate, a modified iron oxide or a modified iron oxide hydrate with a gaseous reduction agent; and
   B. Stabilizing the metallic powder thus produced, the improvement which comprises:
   coating said iron oxide precursor with an antimony compound at a level of up to about 7 weight percent antimony based on the weight of the iron oxide content of said precursor and precipitating tin hydroxides or oxyhydroxides at a level of from about 0.5 to about 8.0 weight percent tin based on the weight of the iron oxide content of said precursor onto the antimony coated iron oxide precursor prior to said reduction.

2. The process of claim 1 wherein the coated iron oxide precursor is also coated with up to about 20 weight percent of at least one metal selected from a group comprising cobalt, chromium and nickel in the form of hydroxide prior to said reduction.

3. The process of claim 1 wherein the amount of antimony employed is from about 1 to 4.5 weight percent based on the weight of the iron oxide content of said precursor.

4. The process of claim 1 wherein the antimony compound is precipitated onto the surface of the iron oxide precursor.

5. The process of claim 1 wherein the reduction is carried out in hydrogen.

6. The process of claim 1 wherein the modified iron oxide hydrate is dehydrated prior to the reduction step.

7. The process of claim 1 wherein the combined amount of antimony and tin used is up to about 7.0 weight percent based on the weight of the iron oxide content of the precursor.

8. The process of claim 1 wherein the amount of antimony and tin employed is respectively from about 0.5 to 3.5 weight percent and from about 1 to about 4 weight percent, each based on the weight of the iron oxide content of the precursor.

9. A magnetically stable powder prepared by the process of claim 1.

10. A magnetically stable powder prepared by the process of claim 2.

* * * * *